Figure 1:
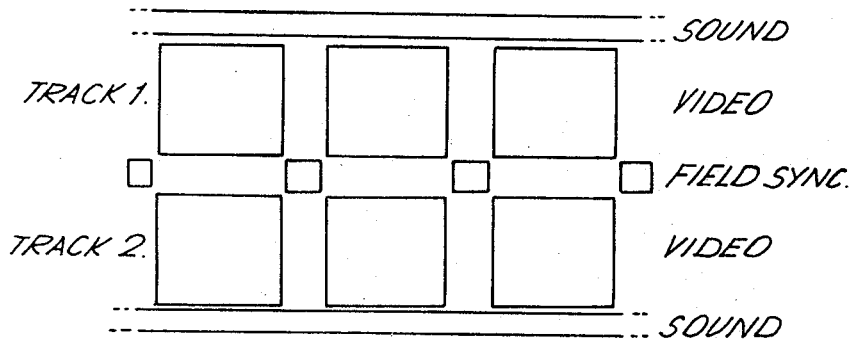

As indicated in FIGS. 15–16, a further air-insulated and twisted cable 80 usable in the transmission line 2 of the instant invention generally comprises a first multistranded conductor 82 and a second multistranded conductor 84 of somewhat smaller cross section or diameter than conductor 82. During the overall formation of conductor cable 80, conductor 84 is helically and tightly wound about conductor 82 while being rotated about the axis 83 of conductor 82.

Conductor 84 is made up preferably of a central core strand 86 of high strength steel or aluminum and an outer multistrand cover layer 88 preferably of six individual strands of suitable electrically conductive aluminum or aluminum alloy materials helically and tightly wound together about core strand 86. Conductor 82 is preferably comprised of a single core strand 90 of suitable high strength aluminum or steel materials and inner and outer multistrand cover layers made up of individual strands 92 and 94 respectively of suitable electrically conductive aluminum or aluminum alloys. The individual strands 92 and 94 of inner and outer cover layers of conductor 82 are wound together in the same or reverse direction relative to each other about core strand 90. Inner cover layer is preferably provided with six individual strands 92 and outer cover layer is preferably provided with twelve individual strands 94. By virtue of conductors 82 and 84 being of different diameters the centroid of any longitudinal section of cable 80 is offset from axis 83 of conductor 82 in a direction toward axis 85 of the smaller conductor 84 along the geometrical major axis M of cable 80.

As in the case of cable 10'' of FIG. 12, the outer periphery of conductors 82 and 84 may be substantially covered by an outer multistrand cover layer 96 shown in dotted lines in FIG. 16 and made up of a suitable electrically conductive grade of aluminum or an aluminum alloy. If desired, suitable filler strands may be interposed in the interstices formed between adjacent strands 88 and 94 of the outer cover layers of conductors 84 and 82.

Figure 2:
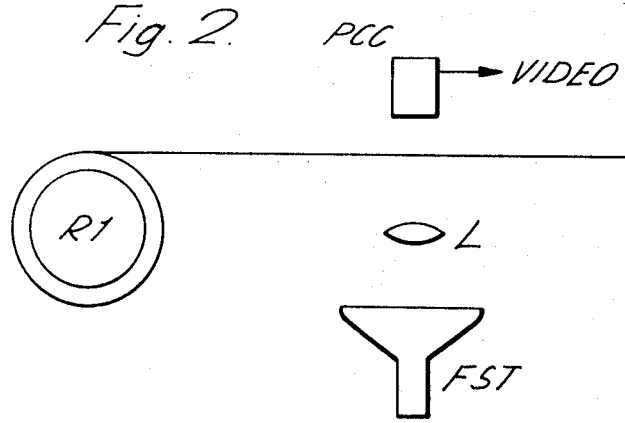
Figure 3:
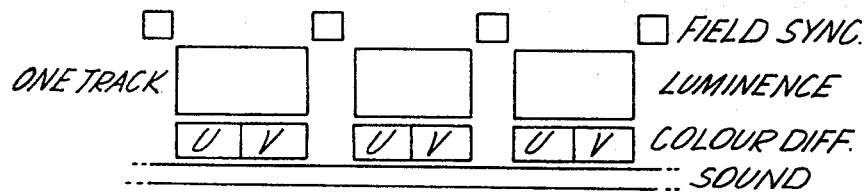
Figure 4:
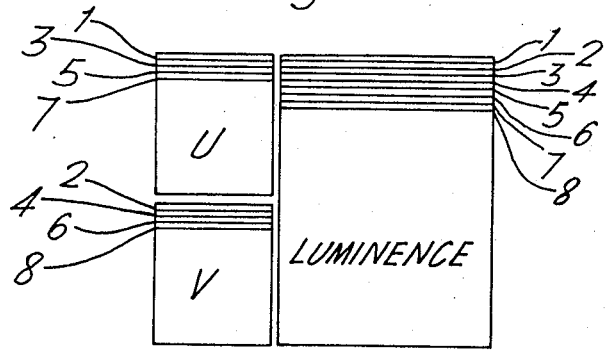
Figure 5:
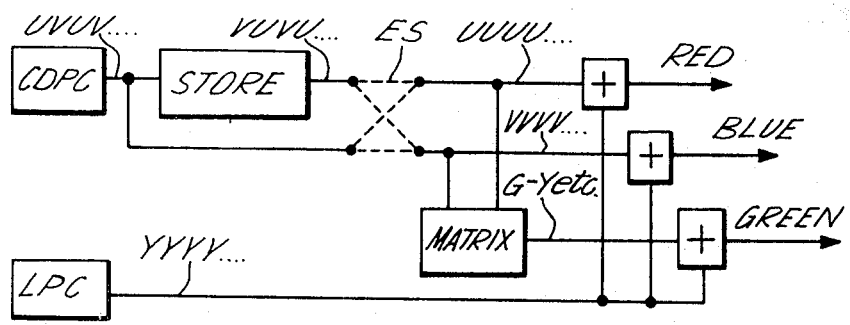

As indicated in FIG. 16, the major axis M of a transverse section of cable 80 has been rotated to a position relative to a vertical plane 98 as well as relative to the general direction of wind flow 9 and the transverse sections of cable 80 are somewhat elliptical or oval shaped. Consequently, cable 80 when used in a transmission line 2 effectively resists wind induced vibrations in a similar manner as set forth in the aforedescribed cable embodiments of FIGS. 2–7, 8–11, 12 and 13–14.

The various cables of FIGS. 2–16 of the instant invention even though being generally of elliptical shape in cross-sectional configuration are structured for ready manufacture by conventional stranding equipment in a suitable fashion. The fact that they are made up of two or more multistranded conductors with or without an outer multistrand cover layer would usually depend upon the electrical capacity requirements of a given conductor and its conditions of installations. Advantageous embodiments of the invention have been shown and described. It will be obvious to those skilled in the art that various changes and modifications can be made therein without departing from the appended claims, wherein:

What is claimed is:

1. A high voltage vibration and sag-resistant electric power transmission line comprised of a plurality of air insulated cables suspended between towers and spaced a predetermined distance apart, each of said cables having a uniform cross section and a continuously varying profile along its length and each of said cables being made up of a plurality of multistranded conductors, at least one of the conductors being continuously and progressively helically and tightly wound about another conductor so as to provide the final cable with a transverse cross section that approximates an elliptically shaped air foil, the major axis of said air foil intersecting while at the same time being progressively rotated about the common central longitudinal axis of the cable for the entire length of the cable so as to define an air insulated cable which in its installed condition in said transmission line has a constantly and uniformly varying profile thickness along its entire length as projected on a vertical plane passing through and coextensive with the said common central longitudinal axis and the extent of the major axis of the cable being on the order of between one and one-half and two and one-half times the extent of the minor axis thereof.

2. A transmission line as set forth in claim 1 wherein the degree of helical twist of a cable along its common central axial length amounts to between 2° to 14° per inch of such axial length.

3. A transmission line as set forth in claim 1 wherein the air insulated cables are spaced apart a distance on the order of from 5 to 30 feet.

4. A transmission line as set forth in claim 1, wherein one of the cables has an elongation characteristic on the order of 0.0008 to 0.0012 in./in. per 1,000 p.s.i. tensile load thereon.

5. A transmission line as set forth in claim 1 wherein the multistranded conductors of at least one of the cables are sheathed in at least one outer layer of electrically conductive strands that are helically and tightly wound about the multistranded conductors.

6. A transmission line as set forth in claim 5 including a filler strand interposed between said multistranded conductors and the outer layer of conductive strands.

7. A transmission line as set forth in claim 1 wherein each cable is made up of a pair of multistranded conductors helically wound about each other with each of said conductors being made up of a core strand and outer conductor strands helically wound about the core strand.

8. A transmission line as set forth in claim 7 wherein the degree of twist of each cable in a line along the cable's common central axial length amounts to between 2° to 14° per inch of such axial length.

9. A transmission line as set forth in claim 1 wherein one of the cables is comprised of a central multistranded conductor and a pair of outer multistranded conductors helically and tightly wrapped about the central conductor.

10. A transmission line as set forth in claim 1 in which the longitudinal centroid of one of the cables is offset relative to the midpoint of the major geometrical axis of the final elliptically shaped cable.

11. A high voltage vibration and sag resistant primarily air insulated power cable, said cable having a uniform cross section and a continuously varying profile along its length, said cable being made up of a plurality of multistranded conductors, at least one of the conductors being continuously and progressively helically and tightly wound about another conductor so as to provide the final and completely finished cable with a transverse cross section that fully approximates an elliptically shaped air foil, the major axis of said air foil intersecting while at the same time being progressively rotated about the common central longitudinal axis of the cable for the entire length of the cable so as to define an air insulated cable which upon installation in a power line maintains a constantly and uniformly varying profile thickness along its entire length as projected on a vertical plane passing through and coextensive with the said common central longitudinal axis and the extent of the major axis of the cable at any given cross section along the entire length of the cable being on the order of between one and one-half and two and one-half times the extent of the minor axis thereof.

12. A power cable as set forth in claim 11 wherein the degree of helical twist of the cable along its common central axial length amounts to between 2° to 14° per inch of such axial length.

13. A power cable as set forth in claim 11 wherein said plurality of multistranded conductors comprises a pair of similarly stranded conductors.

14. A power cable as set forth in claim 11, wherein the cable has an elongation characteristic on the order of 0.0008 to 0.0012 in./in. per 1,000 p.s.i. tensile load thereon.

15. A power cable as set forth in claim 11 wherein the multistranded conductors of the cables are sheathed in at least one outer layer of electrically conductive strands that are helically and tightly wound about the multistranded conductors.

United States Patent

Rogers

[15] 3,659,039

[45] Apr. 25, 1972

[54] METHOD AND APPARATUS FOR RECORDING AND REPRODUCING COLOR IMAGES ON MONOCHROME FILM

[72] Inventor: Bernhard J. Rogers, London, England
[73] Assignee: The Rank Organisation Limited, London, England
[22] Filed: Feb. 26, 1970
[21] Appl. No.: 14,317

[30] Foreign Application Priority Data

Feb. 28, 1969   Great Britain ...................... 10,868/69

[52] U.S. Cl. .................................... 178/5.4 CD, 178/6.7 A
[51] Int. Cl. ........................................... H04n 1/22
[58] Field of Search ...................... 178/6.7 A, 5.2, 5.2 D, 5.4, 178/5.4 CR

[56] References Cited

UNITED STATES PATENTS

| | | | |
|---|---|---|---|
| 2,983,784 | 5/1961 | Razdow | 178/5.4 CR |
| 2,612,553 | 9/1952 | Homrighous | 178/5.2 D |
| 2,769,028 | 10/1956 | Webb | 178/6.7 A |
| 3,475,549 | 10/1969 | Goldmark et al. | 178/6.7 A |

*Primary Examiner*—Robert L. Richardson
*Assistant Examiner*—Richard P. Lange
*Attorney*—Holcombe, Wetherill & Brisebois

[57] ABSTRACT

A method of recording color images on monochrome recording medium, wherein successive frames are recorded on successive areas along the length of the recording medium, and wherein, considering each such area as being composed of two parts of unequal width, luminance signals are recorded on the larger said parts of such areas, and a corresponding pair of color signal components are recorded on the smaller said parts of such areas. The invention includes apparatus for recording and reproducing images according to this method.

5 Claims, 5 Drawing Figures

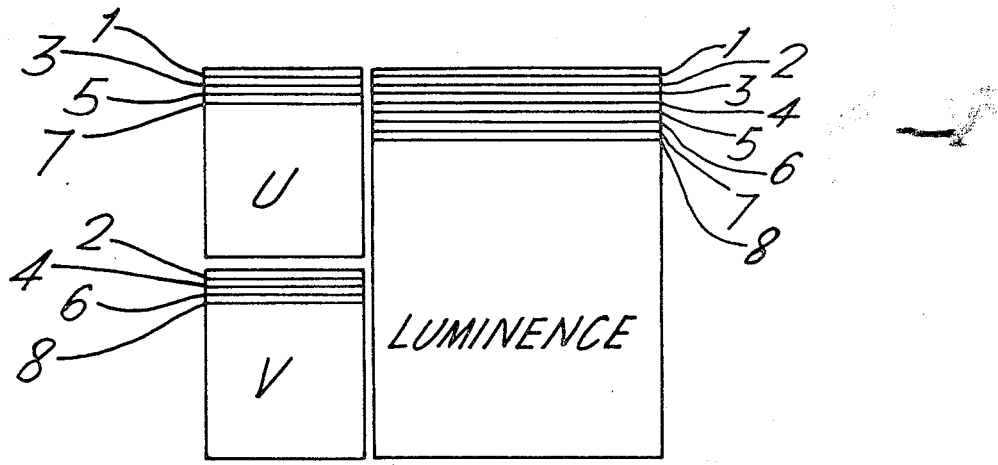

Inventor
B. J. ROGERS
BY
Holcombe, Wetherill & Brisebois
Attorneys

Inventor
B. J. ROGERS